(12) United States Patent
Aratani et al.

(10) Patent No.: US 7,848,903 B2
(45) Date of Patent: Dec. 7, 2010

(54) INFORMATION PROCESSING METHOD AND INFORMATION PROCESSING APPARATUS

(75) Inventors: Shinichi Aratani, Yokohama (JP); Shinji Uchiyama, Yokohama (JP); Kiyohide Satoh, Kawasaki (JP); Daisuke Kotake, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/459,746

(22) Filed: Jul. 25, 2006

(65) Prior Publication Data

US 2007/0092161 A1    Apr. 26, 2007

(30) Foreign Application Priority Data

Jul. 27, 2005   (JP)   ............................. 2005-217555

(51) Int. Cl.
    *G01C 7/00*    (2006.01)
(52) U.S. Cl. ........................ 702/150; 702/95; 702/152; 702/153; 345/629
(58) Field of Classification Search ............. 702/81–84, 702/94, 95, 150–155, 167; 345/629, 632, 345/633
    See application file for complete search history.

(56) References Cited

U.S. PATENT DOCUMENTS

| | | | | |
|---|---|---|---|---|
| 5,193,145 | A * | 3/1993 | Akeley ........................ | 345/423 |
| 6,633,304 | B2 * | 10/2003 | Anabuki et al. ............. | 345/633 |
| 6,765,569 | B2 * | 7/2004 | Neumann et al. ........... | 345/419 |
| 6,770,863 | B2 * | 8/2004 | Walley ....................... | 250/221 |
| 6,856,935 | B1 * | 2/2005 | Fehlis et al. ................ | 702/152 |
| 7,092,109 | B2 | 8/2006 | Satoh et al. ................. | 356/620 |
| 2001/0037184 | A1 * | 11/2001 | Kobayashi .................. | 702/150 |
| 2003/0080976 | A1 | 5/2003 | Satoh et al. ................. | 345/629 |
| 2003/0107569 | A1 * | 6/2003 | Endo et al. .................. | 345/419 |
| 2003/0142115 | A1 | 7/2003 | Endo et al. .................. | 345/633 |
| 2004/0113818 | A1 * | 6/2004 | Yokokohji et al. ........ | 340/995.1 |
| 2004/0212630 | A1 * | 10/2004 | Hobgood et al. ............ | 345/633 |
| 2005/0116964 | A1 | 6/2005 | Kotake et al. ............... | 345/629 |
| 2005/0197578 | A1 | 9/2005 | Aratani et al. .............. | 600/443 |
| 2005/0234333 | A1 | 10/2005 | Takemoto et al. ........... | 600/426 |

(Continued)

OTHER PUBLICATIONS

Uchiyama et al., "MR Platform: a basic body on which mixed reality applications are built", International Symposium on Mixed and Augmented Reality, 2002, Sep. 30-Oct. 1, 2002, 9 pages.*

(Continued)

*Primary Examiner*—Jeffrey R West
(74) *Attorney, Agent, or Firm*—Fitzpatrick, Cella, Harper & Scinto (57) ABSTRACT

An information processing method for obtaining placement information of a first position and orientation sensor attached to an object with respect to the object includes an image input step of inputting an image of the object captured by an image capturing device, and a sensor measurement value input step of inputting a first measurement value of the first position and orientation sensor and a second measurement value of a second position and orientation sensor attached to the image capturing device. An index detecting step detects information about image coordinates of an index attached to the object from the image, and a placement information calculating step calculates the placement information by using the first and second measurement values of the first and second position and orientation sensors and the information about the image coordinates of the index.

4 Claims, 5 Drawing Sheets

U.S. PATENT DOCUMENTS

2007/0009149 A1* 1/2007 Wagner et al. .............. 382/154
2007/0091125 A1 4/2007 Takemoto et al. ........... 345/633
2007/0248261 A1* 10/2007 Zhou et al. .................. 382/154

OTHER PUBLICATIONS

R.H. Haralick, et al., "Review and Analysis of Solutions of the Three Point Perspective Pose Estimation Problem", Systems and Replication, International Journal of Computer Vision, vol. 13, No. 3, pp. 331-356 (1994).

D.G. Lowe, "Fitting Parameterized Three-Dimensional Models to Images", IEEE Transactions on Pattern Analysis and Machine Intelligence, vol. 13, No. 5, pp. 441-450 (May 1991).

S. Uchiyama, et al., "A Robust Registration Method for Merging Real and Virtual Worlds—Combining 6 DOF Sensor and IPC Algorithm", vol. 8, No. 1, pp. 119-125 (2003).

* cited by examiner

INFORMATION PROCESSING METHOD AND INFORMATION PROCESSING APPARATUS

BACKGROUND OF THE INVENTION

1. Field of the Invention

The present invention relates to a technique of obtaining placement information of a 6 degrees of freedom (6-DOF) position and orientation sensor attached to an object with respect to the object.

2. Description of the Related Art

In recent years, studies on mixed reality for seamless fusion of a physical space and a virtual space have been actively conducted. An image display device used in a mixed reality system is mainly realized by a video see-through method. In the image display device using the video see-through method, an image of a virtual space (e.g., a virtual object or text information rendered by computer graphics) generated in accordance with the position and orientation of an image capturing device, such as a video camera, is superimposed on an image of a physical space captured by the image capturing device, and then the mixed image is displayed.

In the mixed reality system, it is important to perform registration between a physical space and a virtual space with high accuracy. Much effort has been made for the registration. A problem about registration in mixed reality leads to a problem about obtaining relative position and orientation between an object on which virtual information is to be superimposed and an image capturing device (hereinafter referred to as the position and orientation of the object with respect to the image capturing device).

As a method for solving the problem, the following methods have traditionally been proposed in a field of photogrammetry or the like (e.g., see R. M. Haralick, C. Lee, K. Ottenberg, and M. Nolle: Review and analysis of solutions of the three point perspective pose estimation problem, International Journal of Computer Vision, vol. 13, no. 3, pp. 331-356, 1994; and D. G. Lowe: Fitting parameterized three-dimensional models to images, IEEE Transactions on PAMI, vol. 13, no. 5, pp. 441-450, 1991).

A plurality of indices are placed or set on an object. The placement of the indices in the coordinate system of the object is known. Then, the position and orientation of the object with respect to an image capturing device are obtained by using the known information, that is, three-dimensional coordinates of the indices in the object coordinate system, and coordinates of projected images of the indices in an image captured by the image capturing device.

However, the registration method using only image information is easily affected by a change in lighting condition and does not have sufficient stability. For this reason, a 6-DOF position and orientation sensor capable of obtaining a stable measurement value without depending on lighting condition, such as a magnetic sensor, is attached to each of the object and the image capturing device. Under this state, the position and orientation of the object with respect to the image capturing device are calculated by using a position and orientation measurement value of the object and a position and orientation measurement value of the image capturing device.

Also, a hybrid position and orientation measuring method has been proposed (e.g., see Uchiyama, Yamamoto, and Tamura: A robust registration method for merging real and virtual worlds—Combining 6 DOF sensor and vision algorithm, Monographs of The Virtual Reality Society of Japan, vol. 8, no. 1, pp. 119-125, 2003). In this method, a measurement value of a 6-DOF position and orientation sensor, such as a magnetic sensor, is calibrated by using coordinates of projected images of indices in an image captured by an image capturing device.

6-DOF position and orientation sensors are attached to an object and an image capturing device, respectively, and relative position and orientation between the object and the image capturing device are obtained. In order to render a virtual object on the object without causing displacement by using the relative position and orientation, placement information of the 6-DOF position and orientation sensor with respect to the object to be measured, that is, relative position and orientation need to be accurately calculated. Conventionally, an operation of obtaining placement information of the 6-DOF position and orientation sensor with respect to the object—hereinafter referred to as calibration information, has been performed manually.

SUMMARY OF THE INVENTION

However, the above-described manual calibration, which requires time and effort, has room for improvement.

The present invention has been made in view of these circumstances and is directed to easily and accurately obtaining placement information of a position and orientation sensor attached to an object with respect to the object.

According to an aspect of the present invention, there is provided an information processing method for obtaining placement information of a first position and orientation sensor attached to an object with respect to the object. The information processing method includes an image input step of inputting an image of the object captured by an image capturing device; a sensor measurement value input step of inputting a first measurement value of the first position and orientation sensor and a second measurement value of a second position and orientation sensor attached to the image capturing device; an index detecting step of detecting information about image coordinates of an index attached to the object from the image; and a placement information calculating step of calculating the placement information by using the first and second measurement values of the first and second position and orientation sensors input in the sensor measurement value input step and the information about the image coordinates of the index detected in the index detecting step.

According to another aspect of the present invention, there is provided an information processing method for obtaining placement information of a position and orientation sensor attached to an object with respect to the object. The information processing method includes an image input step of inputting an image of the object captured by an image capturing device; a sensor measurement value input step of inputting a measurement value of the position and orientation sensor; an index detecting step of detecting information about image coordinates of an index attached to the object from the image; a position and orientation input step of inputting position and orientation of the image capturing device in standard coordinates; and a placement information calculating step of calculating the placement information by using the measurement value input in the sensor measurement value input step, the information about the image coordinates of the index detected in the index detecting step, and the position and orientation of the image capturing device in the standard coordinates input in the position and orientation input step.

Other features and advantages of the present invention will be apparent from the following description taken in conjunc-

The accompanying drawings, which are incorporated in and constitute a part of the specification, illustrate embodiments of the invention and, together with the description, serve to explain the principles of the invention.

DESCRIPTION OF THE EMBODIMENTS

Embodiments of the present invention will now be described in detail in accordance with the accompanying drawings.

First Embodiment

A sensor calibration apparatus according to this embodiment performs calibration on a 6 degrees of freedom (6-DOF) position and orientation sensor attached to an object by using images of indices attached to the object captured by a movable camera to which a 6-DOF position and orientation sensor is attached. In this embodiment, position and orientation of the 6-DOF position and orientation sensor with respect to the object are dealt with as unknown parameters. Hereinafter, the 6-DOF position and orientation sensor calibration apparatus and 6-DOF position and orientation sensor calibration method according to this embodiment are described.

Figure 1:
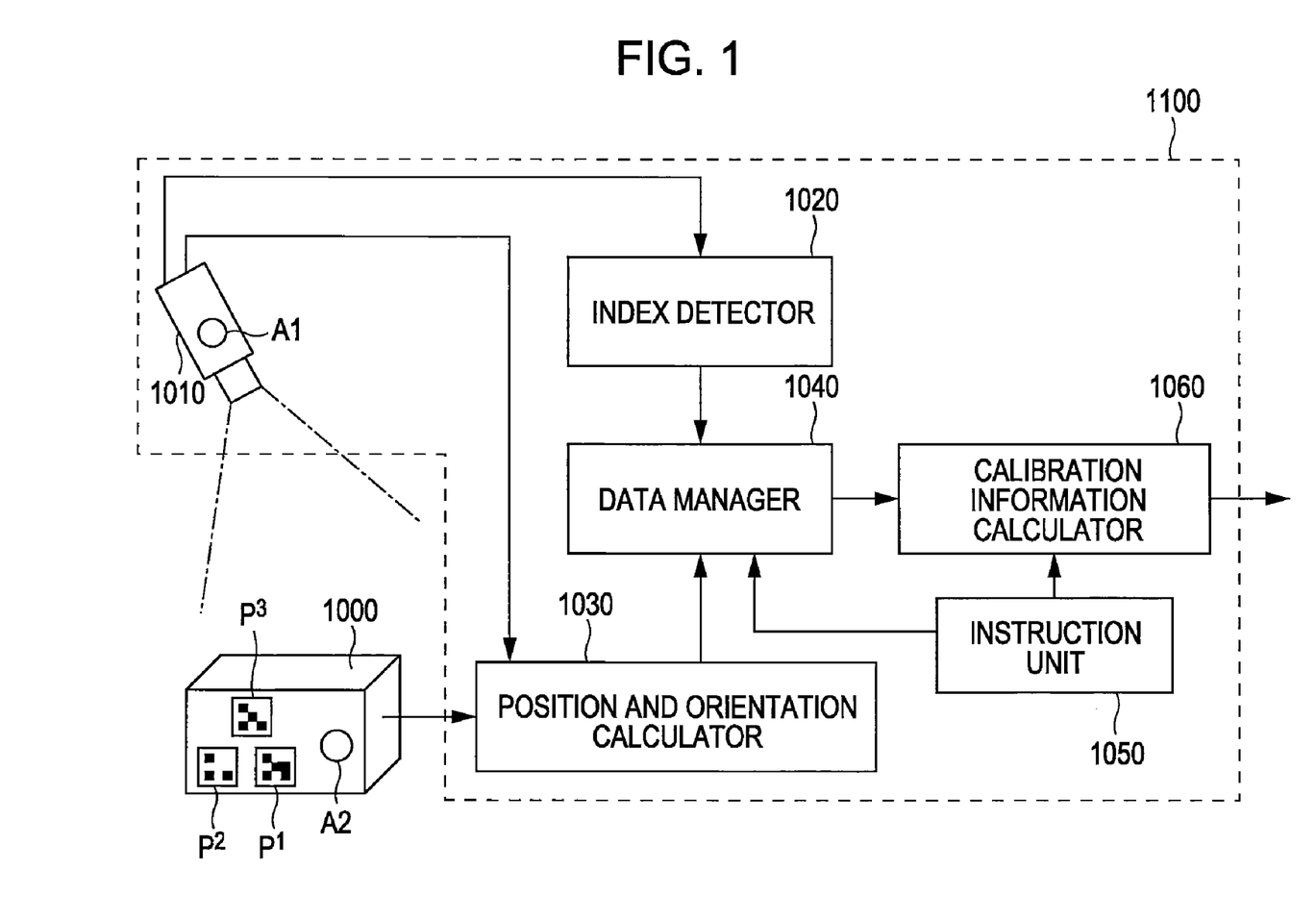
FIG. 1 shows a schematic configuration of a sensor calibration apparatus according to a first embodiment of the present invention.

FIG. 1 shows a schematic configuration of the sensor calibration apparatus 1100 according to this embodiment. As shown in FIG. 1, the sensor calibration apparatus 1100 according to this embodiment includes an image capturing unit 1010, an index detector 1020, a position and orientation calculator 1030, a data manager 1040, an instruction unit 1050, and a calibration information calculator 1060. The sensor calibration apparatus 1100 connects to an object 1000 to which indices are attached.

A 6-DOF position and orientation sensor A2 is attached to the object 1000, so that the position and orientation of the 6-DOF position and orientation sensor A2 in the world coordinate system can be measured. The 6-DOF position and orientation sensor A2 connects to the position and orientation calculator 1030. A 6-DOF position and orientation sensor A1 is attached to the image capturing unit 1010. The position and orientation of the 6-DOF position and orientation sensor A1 with respect to the camera of the image capturing unit 1010 are known, so that the position and orientation of the camera in the world coordinated system can be measured. The 6-DOF position and orientation sensor A1 connects to the position and orientation calculator 1030.

Figure 3A:
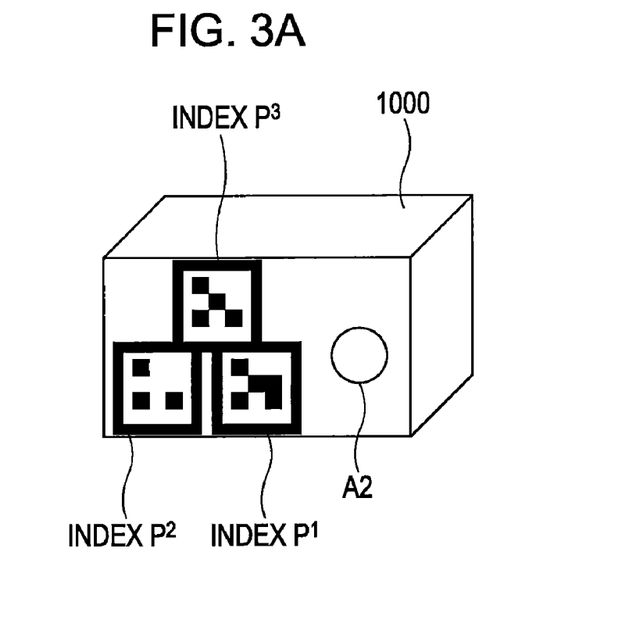
FIGS. 3A and 3B show schematic configurations of indices according to the first embodiment.
Figure 3B:
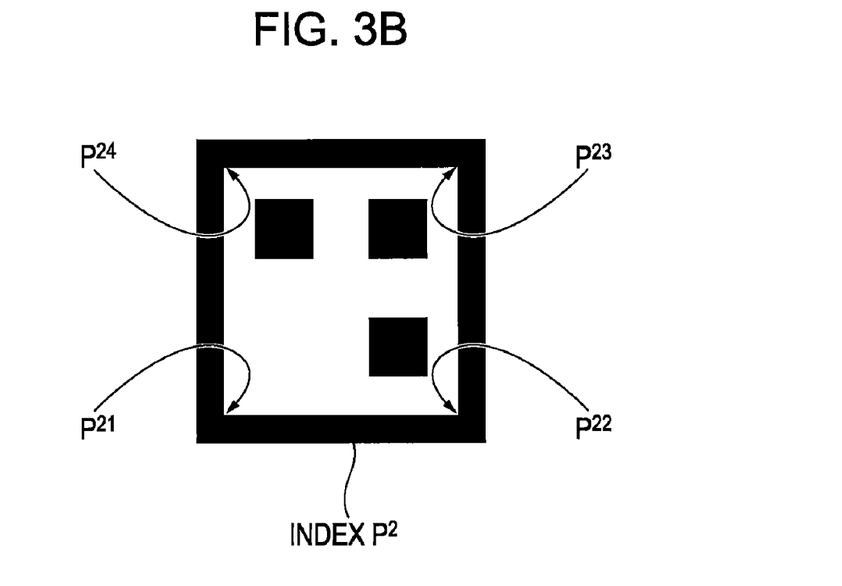

As shown in FIG. 3A, a plurality of indices are placed on the object 1000. The indices placed on the object are represented by $P^k$ ($k=1, \ldots K_o$). Note that $K_o$ represents the number of indices placed on the object. As shown in FIG. 3B, each index $P^k$ has points $p^{ki}$ (($k=1, K_o$), ($i=1, \ldots N_k$)). Note that $N_k$ represents the total number of points constituting the index $P^k$.

Herein, the position and orientation of each index in the object coordinate system (coordinate system in which one point on the object is defined as an origin point and three axes orthogonal to each other are defined as an X-axis, a Y-axis, and a Z-axis) are known. Also, the positions of the respective points constituting each index placed on the object are known in the index coordinate system defined for each index.

The index $P^k$ may be in any form as long as screen coordinates of a projected image thereof on a captured image can be detected and as long as the index and each point therein can be identified. For example, the square indices shown in FIGS. 3A and 3B have a pattern representing an identifier therein and can be uniquely identified. When such an index is to be detected, binarization and labeling are performed on a captured image, and then objects defined by four straight lines are extracted as prospective indices from a region having a predetermined area or more. Then, whether a prospective region has a specific pattern is determined so as to determine whether the prospective region is an index region, and then an inner pattern is read so as to obtain the orientation and identifier of the index.

The image capturing unit 1010 captures images of the indices placed on the object from various positions and directions. The captured images are input to the index detector 1020.

The index detector 1020 receives images from the image capturing unit 1010 and detects image coordinates of the respective points constituting each index $p^k$ existing in the received images.

Then, the index detector 1020 outputs image coordinates $u^{Pkni}$ of points $p^{kni}$ constituting each of the detected indices $P^{kn}$ and identifiers $k_n$ thereof to the data manager 1040. Herein, n ($n=1, \ldots, M$) is an index for each detected index, and M represents the total number of the detected indices. In the case shown in FIG. 1, for example, three square indices having identifiers 1, 2, and 3, respectively, are captured. In this case, M=3, and identifiers $k_1=1$, $k_2=2$, and $k_3=3$ and image coordinates $u^{Pk1i}$, $u^{Pk2i}$, and $u^{Pk3i}$ ($i=1, 2, 3, 4$) corresponding thereto are output.

Hereinafter, the position and orientation calculator 1030 is described. Now, assume that a three-dimensional vector indicating a position in a three-dimensional coordinate system A with respect to a three-dimensional coordinate system B is t and that a 3×3 rotation matrix indicating an orientation is R. A coordinate $x_B$ (three-dimensional vector) in the coordinate system B of a point whose position in the coordinate system A is F represented by $x_A$ (three-dimensional vector) is expressed by expression (2) in a homogeneous coordinate expression by using a 4×4 matrix $M_{BA}$ shown in expression (1).

$$M_{BA} = \begin{bmatrix} R & t \\ 0 & 1 \end{bmatrix} \quad \text{expression (1)}$$

$$\begin{bmatrix} x_B \\ 1 \end{bmatrix} = M_{BA} \begin{bmatrix} x_A \\ 1 \end{bmatrix} \quad \text{expression (2)}$$

In this embodiment, $M_{BA}$ is used to represent the position and orientation in the coordinate system A with respect to the coordinate system B.

The position and orientation calculator 1030 calculates the position and orientation $M_{A2C}$ of the camera in the coordinate system of the 6-DOF position and orientation sensor A2 by using expression (3) on the basis of the position and orientation $M_{WC}$ of the camera in the world coordinate system obtained from a measurement value of the 6-DOF position and orientation sensor A1 attached to the camera and the position and orientation $M_{WA2}$ of the 6-DOF position and orientation sensor A2 in the world coordinate system obtained from a measurement value of the 6-DOF position and orientation sensor A2 attached to the object.

$$M_{A2C} = M_{WA2}^{-1} \cdot M_{WC} \qquad \text{expression (3)}$$

In this embodiment, position and orientation are expressed by a six-dimensional vector, as described below. Position and orientation are expressed by a ternary vector $x=[x\ y\ z]^T$ and a ternary vector $\omega=[\xi\ \psi\ \zeta]^T$, respectively. There are various methods of expressing an orientation by a ternary vector. In this case, the orientation is expressed by a ternary vector in which a rotation angle is defined by the magnitude of the vector and a rotation axis direction is defined by the direction of the vector. The position x and orientation ω are collectively expressed by a six-dimensional vector $a=[x\ y\ z\ \xi\psi\zeta]^T$.

The 4×4 matrix $M_{A2C}$ representing the position and orientation of the camera in the coordinate system of the 6-DOF position and orientation sensor A2 obtained based on a value output from the sensor is expressed by a six-dimensional vector $a_{A2C}=[x_{A2C}\ y_{A2C}\ z_{A2C}\ \xi_{A2C}\ \psi_{A2C}\ \zeta_{A2C}]^T$. Transformation from $M_{A2C}$ to $a_{A2C}$ can be done by using a known method.

The position and orientation of the camera in the coordinate system of the 6-DOF position and orientation sensor A2 are output to the data manager 1040 in response to a request from the data manager 1040.

Upon receiving a data obtaining command from an operator (not shown), the instruction unit 1050 transmits instructions to "obtain data" to the data manager 1040. Upon receiving a calibration information calculating command, the instruction unit 1050 transmits instructions to "calculate calibration information" to the calibration information calculator 1060.

Upon receiving the instructions to "obtain data" from the instruction unit 1050, the data manager 1040 receives the position and orientation of the camera in the coordinate system of the 6-DOF position and orientation sensor A2 from the position and orientation calculator 1030. Also, the data manager 1040 receives the image coordinates and identifiers of indices from the index detector 1020. Then, the data manager 1040 adds a set of<the position and orientation of the camera in the coordinate system of the 6-DOF position and orientation sensor A2 at a given time; the image coordinates of indices detected at the given time; and the identifiers of the indices detected at the given time>to a data list and holds the data list. Also, the data manager 1040 outputs the generated data list to the calibration information calculator 1060 in response to a request from the calibration information calculator 1060.

Upon receiving the instructions to "calculate calibration information" from the instruction unit 1050, the calibration information calculator 1060 receives the data list from the data manager 1040 and performs calibration on the basis of the data list. Then, the calibration information calculator 1060 outputs calibration information obtained through the calibrating process (that is, the position and orientation of the 6-DOF position and orientation sensor in the object coordinate system).

Figure 2:
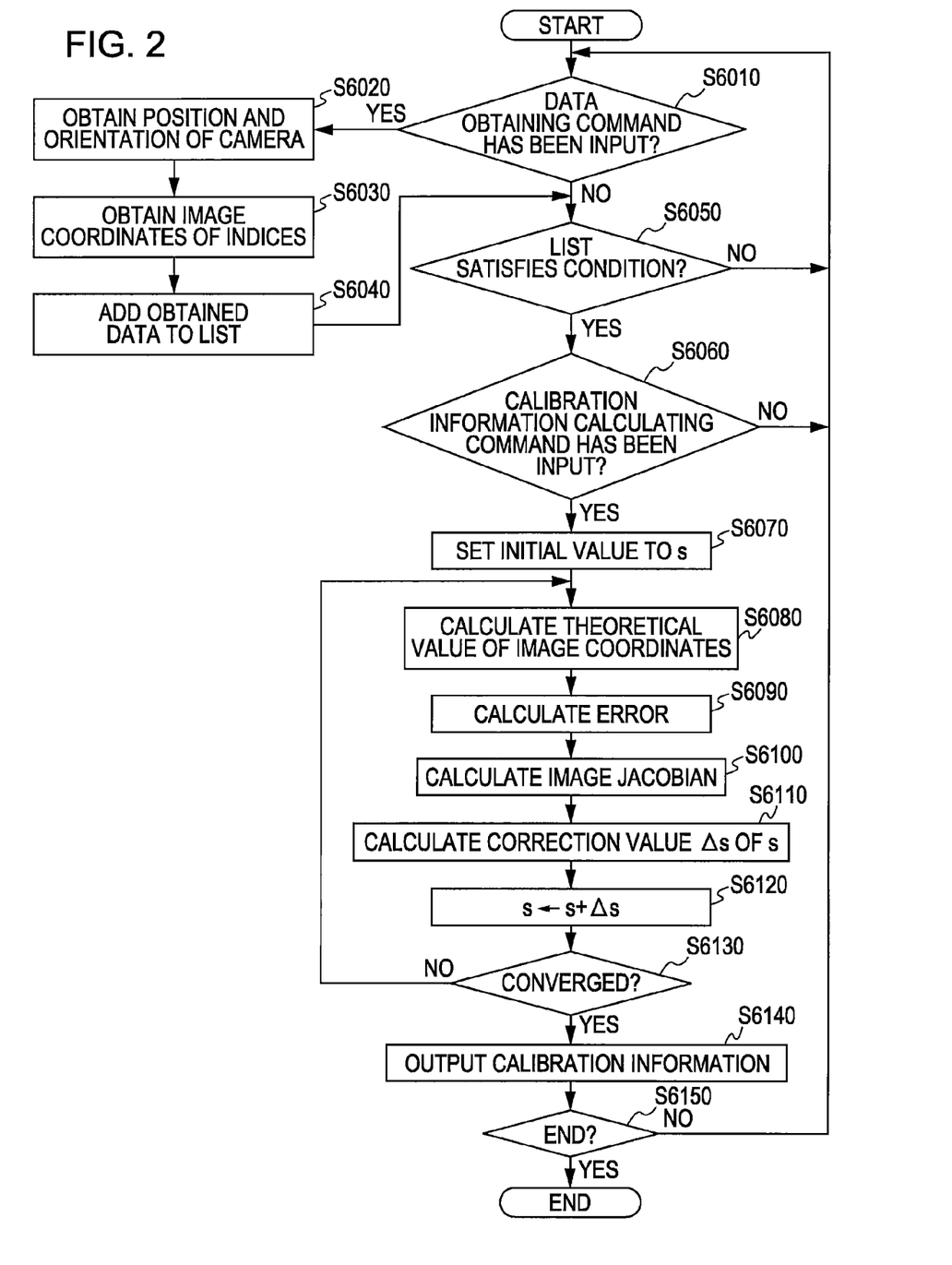
FIG. 2 is a flowchart showing a process of a sensor calibration method according to the first embodiment.

FIG. 2 is a flowchart showing a process of obtaining calibration information performed by the calibration apparatus according to this embodiment. The program code of this flowchart is stored in a memory (not shown), such as a RAM (random access memory) or a ROM (read only memory), and is read and executed by a CPU (central processing unit) (not shown).

In step S6010, the instruction unit 1050 determines whether a data obtaining command has been input by an operator. The operator inputs the data obtaining command when the object 1000 or the camera 1010 is placed at a position of obtaining data for sensor calibration. If the instruction unit 1050 determines that the data obtaining command has been input, the process proceeds to step S6020.

In step S6020, the data manager 1040 receives, from the position and orientation calculator 1030, the position and orientation $a_{A2C}=[x_{A2C}\ y_{A2C}\ z_{A2C}\ \xi_{A2C}\ \psi_{A2C}\ \zeta_{A2C}]^T$ of the camera in the coordinate system of the 6-DOF position and orientation sensor A2 calculated based on the value output from the sensor.

In step S6030, the data manager 1040 receives, from the index detector 1020, image coordinates $u^{Pkni}$ of points constituting the indices $P^{kn}$ detected by the index detector 1020 and identifiers $k_n$ thereof. The index detector 1020 performs an index detecting process on every input image. Thus, in this step, the index detector 1020 can obtain the position and orientation of the camera in the coordinate system of the 6-DOF position and orientation sensor A2 and the image coordinates and identifiers of indices of a given time. The information input from the index detector 1020 need not always include information about all indices, but may include information about an index or indices detected on the image at the time.

Then, in step S6040, the data manager 1040 adds each set of the input data as data $D_L$ to a data list DL, for each of the detected indices $P^{kn}$. Specifically, $a_{A2C}$ input from the position and orientation calculator 1030 is set to $a_{A2Cj}=[x_{A2Cj}\ y_{A2Cj}\ z_{A2Cj}\ \xi_{A2Cj}\ \psi_{A2Cj}\ \zeta_{A2Cj}]^T$, each identifier $k_n$ input from the index detector 1020 is set to $k_{nj}$, and $u^{Pkni}$ input from the index detector 1020 is set to $u_L^{Pknji}$. Then, a set of $D_L=[a_{A2Cj}, u_L^{Pknji}, k_{nj}]$ is registered as the L-th data in the data list DL. Herein, j (j=1, ..., $N_j$) is an index of a captured image. L (L=1, ..., $N_L$) is an index of each set of data registered in the data list DL. $N_j$ represents the total number of captured images and $N_L$ represents the total number of registered sets of data.

In the above-described steps, the data is obtained.

In step S6050, the data manager 1040 determines whether the obtained data list has enough information to calculate calibration information. If the data list does not have enough information, the process returns to step S6010, where input of a data obtaining command is waited for. On the other hand, if the data list satisfies a condition of calculating calibration information, the process proceeds to step S6060. The data list is determined to have enough information to calculate calibration information if the data list DL includes at least two sets of data about all indices, for example. However, since the accuracy of derived calibration information increases as the diversity of input data increases, the condition may be set so that more data is required.

Then, in step S6060, it is determined whether a calibration information calculating command has been input by the operator. If the calibration information calculating command has been input, the process proceeds to step S6070. If the command has not been input, the process returns to step S6010, where input of a data obtaining command is waited for.

The calibration information calculator 1060 deals with calibration information to be obtained, that is, the position and orientation of the 6-DOF position and orientation sensor A2 in the object coordinate system, as an unknown parameter and as a six-valued vector. Hereinafter, the position and orientation of the 6-DOF position and orientation sensor A2 in the object coordinate system are described as $s_{OA2}=[x_{OA2}\ y_{OA2}\ z_{OA2}\ \xi_{OA2}\ \psi_{OA2}\ \zeta_{OA2}]^T$.

In step S6070, the calibration information calculator 1060 gives the state vector $s_{OA2}$ an initial value. As the initial value of $s_{OA2}$, the operator may manually input a rough value via the instruction unit 1050. When a transformation matrix representing the position and orientation of the camera in the coordinate system of the 6-DOF position and orientation sensor A2 is $M_{A2C}$, when a transformation matrix representing the position and orientation of the 6-DOF position and orientation sensor A2 in the object coordinate system is $M_{OA2}$, and when a transformation matrix representing the position and orientation of the index attached to the object in the object coordinate system is $M_{OM}$, a transformation matrix $M_{CM}$ from the index coordinate system to the camera coordinate system is expressed by expression (4).

$$M_{CM}=M_{A2C}^{-1}\cdot M_{OA2}^{-1}\cdot M_{OM} \qquad \text{expression (4)}$$

$$x_{c_i}^{P_{k_n j^i}} = \begin{bmatrix} x_{c_i}^{P_{k_n j^i}} & y_{c_i}^{P_{k_n j^i}} & z_{c_i}^{P_{k_n j^i}} & 1 \end{bmatrix}^T \qquad \text{expression (6)}$$

$$= M_{A2C}^{-1}\cdot M_{OA2}^{-1}(s_{OA2})\cdot M_{OM}\cdot x_M^{P_{k_n j^i}}$$

In expression (7), the coordinates $u_L^{Pknji'}$ of the index $P^{knj}$ on the image is obtained on the basis of $x_{CL}^{Pknji}$.

$$u_L^{P_{k_n,j}i1} = \begin{bmatrix} ux_L^{P_{k_n,j}i1} & uy_L^{P_{k_n,j}i1} \end{bmatrix}^T \qquad \text{expression (7)}$$

$$= \begin{bmatrix} -f_x^B \dfrac{x_{cL}^{P_{k_n,j}i}}{z_{cL}^{P_{k_n,j}i}} & -f_y^B \dfrac{y_{cL}^{P_{k_n,j}i}}{z_{cL}^{P_{k_n,j}i}} \end{bmatrix}^T$$

Herein, $f_x^B$ and $f_y^B$ are focal lengths of the camera 1010 in the x-axis direction and the y-axis direction, respectively, and are held in advance as known values. $M_{OA2}(s_{OA2})$ is a transformation matrix set by $s_{OA2}$ and is defined by the following expression (8).

$$M_{OA2}(s_{OA2}) = \qquad \text{expression (8)}$$

$$\begin{bmatrix} \dfrac{\xi_{OA2}^2}{\theta^2}(1-\cos\theta)+\cos\theta & \dfrac{\xi_{OA2}\psi_{OA2}}{\theta^2}(1-\cos\theta)-\dfrac{\zeta_{OA2}}{\theta}\sin\theta & \dfrac{\xi_{OA2}\zeta_{OA2}}{\theta^2}(1-\cos\theta)+\dfrac{\psi_{OA2}}{\theta}\sin\theta & x_{OA2} \\ \dfrac{\psi_{OA2}\xi_{OA2}}{\theta^2}(1+\cos\theta)+\dfrac{\zeta_{OA2}}{\theta}\sin\theta & \dfrac{\psi_{OA2}^2}{\theta^2}(1-\cos\theta)+\cos\theta & \dfrac{\psi_{OA2}\zeta_{OA2}}{\theta^2}(1-\cos\theta)-\dfrac{\xi_{OA2}}{\theta}\sin\theta & y_{OA2} \\ \dfrac{\zeta_{OA2}\xi_{OA2}}{\theta^2}(1-\cos\theta)-\dfrac{\psi_{OA2}}{\theta}\sin\theta & \dfrac{\zeta_{OA2}\psi_{OA2}}{\theta^2}(1-\cos\theta)+\dfrac{\xi_{OA2}}{\theta}\sin\theta & \dfrac{\zeta_{OA2}^2}{\theta^2}(1-\cos\theta)+\cos\theta & z_{OA2} \\ 0 & 0 & 0 & 1 \end{bmatrix}$$

In step S6080, the calibration information calculator 1060 calculates a calculation value $u_L^{Pknji'}=[u_{xL}^{Pknji'},\ u_{yL}^{Pknji'}]$ of image coordinates of the index $P^{knj}$ for each L, on the basis of each data set $D_L=[a_{A2Cj},\ u_L P^{knji},\ k_j]$ ((j=1, 2, ..., $N_j$) (L=1, 2, ..., $N_L$)) in the data list DL and the state vector $s_{OA2}$. Herein, the calculation value of the image coordinates of the index indicates a position (coordinates) to be seen in the image of a point $P^{knj}$, whose position vector $x_M^{Pknj}$ in the index coordinate system is known, of the index whose position and orientation in the object coordinate system is $M_{OM}$. Calculation of the $u_L^{Pknji'}$ is performed on the basis of a function of the state vector $s_{OA2}$ indicating the position of the 6-DOF position and orientation sensor A2 in the object coordinate system.

$$u_L^{P_{k_n j}i''} = F_L(s_{OA2}) \qquad \text{expression (5)}$$

Specifically, the function $F_L(\ )$ is constituted by the following expressions (6) and (7). In expression (6), a position vector $x_{CL}^{Pknji}$ of the index $P^{knj}$ in the camera coordinates when the L-th data is obtained (that is, when the position and orientation of the camera 1010 in the data set is $a_{A2Cj}$) is obtained on the basis of $s_{OA2}$.

Herein, $$\theta=\sqrt{\xi_{OA2}^2+\psi_{OA2}^2+\zeta_{OA2}^2} \qquad \text{expression (9)}$$

In step S6090, the calibration information calculator 1060 calculates an error $\Delta u_L^{Pknji}$ between the actual image coordinates $u_L^{Pknji}$ of the index $P^{knj}$ included in each data set of the data list DL and the corresponding calculation value $u_L^{Pknji'}$ of the image coordinates for each L by using the following expression (10).

$$\Delta u_l^{P_{k_n j}i} = u_l^{P_{k_n j}i} - u_l^{P_{k_n j}i'} \qquad \text{expression (10)}$$

In step S6100, the calibration information calculator 1060 calculates an image Jacobian about the state vector $s_{OA2}$ (that is, a Jacobian matrix of (2×$N_L$) rows×6 columns having a solution obtained by partially differentiating the function $F_J(\ )$ of expression (5) by each element of the state vector $s_{OA2}$ as each element) $J_{uL}^{Pknji}{}_s$ ($=\delta u_L^{Pknji}/\delta s_{OA2}$) for each L. Herein, $N_L$ is the total number of the detected indices.

In step S6110, the calibration information calculator 1060 calculates a correction value $\Delta s_{OA2}$ of the $s_{OA2}$ on the basis of the errors $\Delta u_L^{Pknji}$ and the Jacobian matrices $J_{uL}^{Pknji}{}_s$ for all Ls calculated in the above-described steps. Specifically, an error vector of a $2N_L$-dimensional vector in which the errors $\Delta u_L^{Pknji}$ for all Ls are vertically arranged:

$$U = \begin{bmatrix} \Delta u_1^{P_{k_1}1^1} \\ \vdots \\ \Delta u_L^{P_{k_nj}i} \\ \vdots \\ \vdots \\ \Delta u_{N_L}^{P_{k_N N_j N_k}} \end{bmatrix} \quad \text{expression (11)}$$

and a matrix of $(2N_L)$ rows×6 columns in which the Jacobian matrices $J_{uL}^{Pknji}$s are vertically arranged:

$$\Phi = \begin{bmatrix} J_{u_1s}^{P_{k_1}1^1} \\ \vdots \\ J_{u_1s}^{P_{k_nj}i} \\ \vdots \\ \vdots \\ J_{u_{N_L}s}^{P_{k_N N_j N_k}} \end{bmatrix} \quad \text{expression (12)}$$

are generated, and the correction value $\Delta s_{OA2}$ is calculated by using a pseudo inverse matrix $\Phi^+$ of $\Phi$ in accordance with the following expression.

$$\Delta s_{OA2} = \Phi^+ U \quad \text{expression (13)}$$

Herein, since $\Delta s_{OA2}$ is a six-dimensional vector, $\Delta s_{OA2}$ can be calculated if $2N_L$ is 6 or more. $\Phi^+$ can be calculated by using an expression $\Phi^+ = (\Phi^T \Phi)^{-1} \Phi^T$. But it may be calculated by another method. For example, expression (13) is synonymous with the solution of the simultaneous equations. The simultaneous equations may be calculated by ICCG method, sweeping-out method, or another method.

In step S6120, the calibration information calculator 1060 corrects $s_{OA2}$ by using the correction value $\Delta s_{OA2}$ calculated in step S6110 in accordance with the following expression (14) and sets the obtained value as a new $s_{OA2}$. Herein, the state vector $s_{OA2}$ is a state vector of the position and orientation of the 6-DOF position and orientation sensor A1 attached to the camera in the object coordinate system.

$$s_{OA2} + \Delta s_{OA2} \rightarrow s_{OA2} \quad \text{expression (14)}$$

In step S6130, the calibration information calculator 1060 determines whether the calculation has converged by determining whether the error vector U is smaller than a predetermined threshold or whether the correction value $\Delta s_{OA2}$ is smaller than a predetermined threshold. If the calculation has not converged, the process returns to step S6080 and the following steps are repeated by using the corrected state vector $s_{OA2}$.

If it is determined in step S6130 that the calculation has converged, the process proceeds to step S6140. In step S6140, the calibration information calculator 1060 outputs calibration information, that is, the position and orientation $s_{OA2}$ of the 6-DOF position and orientation sensor in the object coordinate system. At this time, $s_{OA2}$ itself may be output. Alternatively, a position component of $s_{OA2}$ may be represented by a ternary vector and an orientation component thereof may be represented by Euler angles or a 3×3 rotation matrix. Alternatively, a coordinate transformation matrix $M_{OA2}$ generated from $s_{OA2}$ may be output.

Finally, in step S6150, it is determined whether the calibration process should be ended. If the operator provides instructions to end the calibration process to the sensor calibration apparatus 1100, the process ends. If the operator provides instructions to continue the calibration process (recalibration), the process returns to step S6010, where input of a data obtaining command is waited for.

With the above-described process, the position or the position and orientation of the 6-DOF position and orientation sensor A2 attached to the object with respect to the object (in the object coordinate system) can be obtained.

<Modification 1-1>

In the above-described first embodiment, the position and orientation of the 6-DOF position and orientation sensor A2 attached to the object with respect to the object are obtained as calibration information. Alternatively, the position and orientation of the 6-DOF position and orientation sensor A1 attached to the camera with respect to the camera may also be obtained as calibration information.

In the above-described first embodiment, the position and orientation $M_{CA1}$ of the 6-DOF position and orientation sensor A1 attached to the camera in the camera coordinate system is known, but $M_{CA1}$ is regarded as an unknown parameter in this modification. The position and orientation $M_{A2A1}$ of the 6-DOF position and orientation sensor A1 attached to the camera in the coordinate system of the 6-DOF position and orientation sensor A2 attached to the object is calculated by using the following expression (15) on the basis of the position and orientation $M_{WA1}$ of the 6-DOF position and orientation sensor A1 attached to the camera in the world coordinate system obtained from a measurement value of the 6-DOF position and orientation sensor A1 and the position and orientation $M_{WA2}$ of the 6-DOF position and orientation sensor A2 attached to the object in the world coordinate system obtained from a measurement value of the 6-DOF position and orientation sensor A2.

$$M_{A2A1} = M_{WA2}^{-1} \cdot M_{WA1} \quad \text{expression (15)}$$

When the position and orientation of the 6-DOF position and orientation sensor A1 in the camera coordinate system is $M_{CA1}$, when a transformation matrix representing the position and orientation of the 6-DOF position and orientation sensor A1 in the coordinate system of the 6-DOF position and orientation sensor A2 is $M_{A2A1}$, when a transformation matrix representing the position and orientation of the 6-DOF position and orientation sensor A2 in the object coordinate system is $M_{OA2}$, and when a transformation matrix representing the position and orientation of an index attached to the object in the object coordinate system is $M_{OM}$, a transformation matrix $M_{CM}$ from the index coordinate system to the camera coordinate system can be expressed by expression (16).

$$M_{CM} = M_{CA1} \cdot M_{A2A1}^{-1} \cdot M_{OA2}^{-1} \cdot M_{OM} \quad \text{expression (16)}$$

Calibration information to be obtained, that is, the position and orientation $M_{OA2}$ of the 6-DOF position and orientation sensor A2 in the object coordinate system and the position and orientation $M_{CA1}$ of the 6-DOF position and orientation sensor A1 in the camera coordinate system are dealt with as a 6-valued vector, as in the above-described embodiment. Herein, the position and orientation of the 6-DOF position and orientation sensor A2 in the object coordinate system are expressed by a state vector $s_{OA2} = [x_{OA2} \; y_{OA2} \; z_{OA2} \; \xi_{OA2} \; \psi_{OA2}$ $\zeta_{OA2}]^T$, and the position and orientation of the 6-DOF position and orientation sensor A1 in the camera coordinate system are expressed by a state vector $s_{CA1}=[x_{CA1}\ y_{CA1}\ z_{CA1}\ \xi_{CA1}\ \psi_{CA1}\ \zeta_{CA1}]^T$.

An appropriate initial value is given to each of the state vectors $s_{OA2}$ and $s_{CA1}$. The initial value is obtained in advance by performing, for example, manual measurement. An unknown parameter as calibration information is defined as $s=[s_{OA2}{}^T\ s_{CA1}{}^T]^T$, and an optimum value of s with respect to all input data is obtained through repeated calculation using image Jacobian, as in the above-described embodiment. Accordingly, the position and orientation of the 6-DOF position and orientation sensor A2 in the object coordinate system and the position and orientation of the 6-DOF position and orientation sensor A1 in the camera coordinate system can be obtained, and the obtained positions and orientations can be output as calibration information.

Second Embodiment

In a sensor calibration apparatus according to the second embodiment, placement information of a 6-DOF position and orientation sensor attached to an object (position and orientation of the sensor in the object coordinate system) is calculated. In the second embodiment, calibration of the 6-DOF position and orientation sensor attached to the object is performed by using the position and orientation of the camera with respect to the object obtained from correspondence between physical coordinates and image coordinates of a calibrated index and the position and orientation of the camera in the world coordinate system obtained in a certain method. Hereinafter, the 6-DOF position and orientation sensor calibration apparatus and 6-DOF position and orientation sensor calibration method according to the second embodiment are described.

Figure 4:
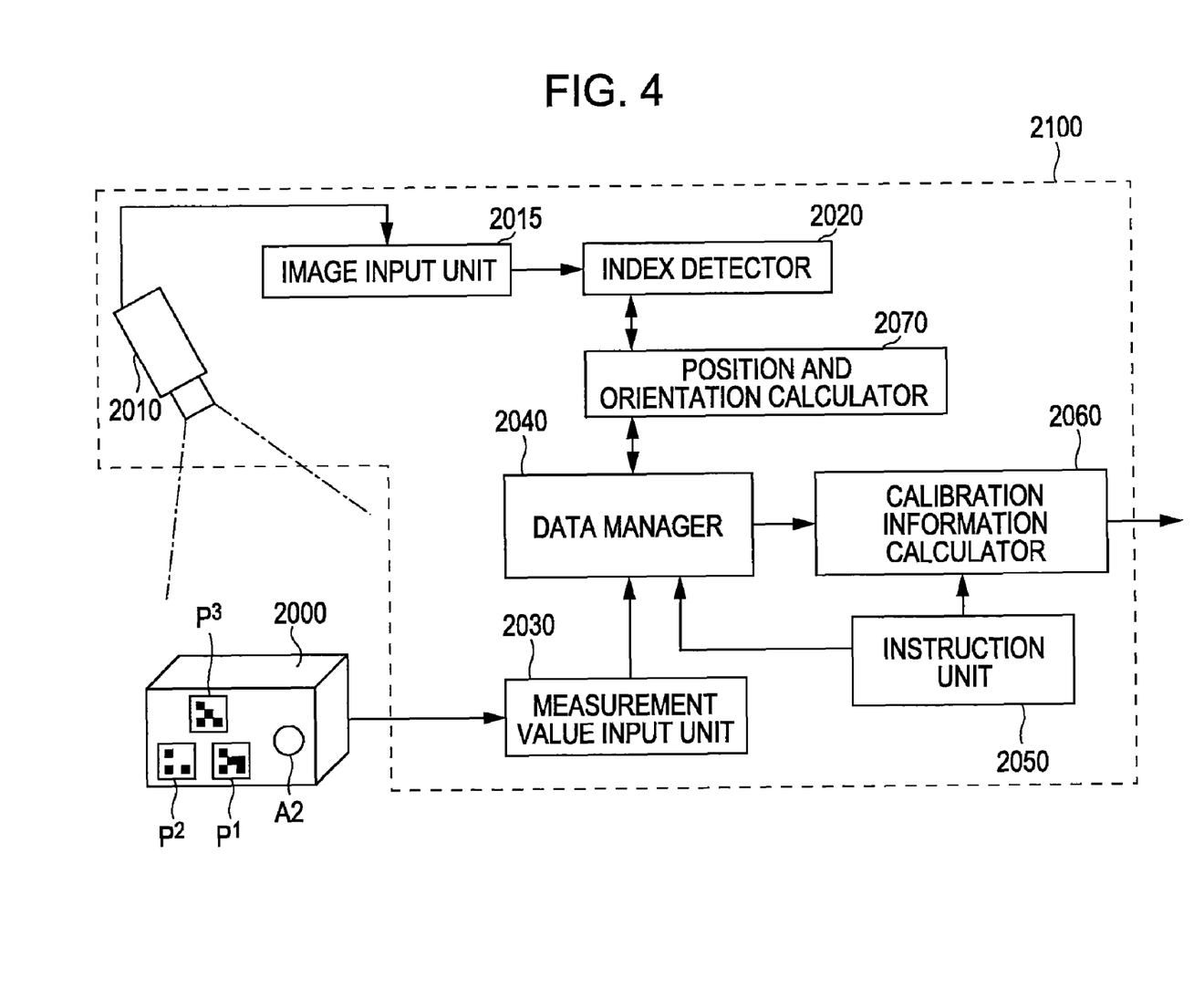
FIG. 4 shows a schematic configuration of a sensor calibration apparatus according to a second embodiment of the present invention.

FIG. 4 shows a schematic configuration of the sensor calibration apparatus 2100 according to the second embodiment. As shown in FIG. 4, the sensor calibration apparatus according to the second embodiment includes a camera 2010, an image input unit 2015, an index detector 2020, a measurement value input unit 2030, a data manager 2040, an instruction unit 2050, a calibration information calculator 2060, and a position and orientation calculator 2070. The apparatus 2100 connects to an object 2000 to which calibrated indices are attached.

A 6-DOF position and orientation sensor A2 is attached to the object 2000, so that the position and orientation of the 6-DOF position and orientation sensor A2 in the world coordinate system can be measured. The 6-DOF position and orientation sensor A2 connects to the measurement value input unit 2030. The position and orientation of the camera 2010 in the world coordinate system (hereinafter represented by $M_{WC}$ as in the first embodiment) can be obtained in a certain method. In the second embodiment, the camera 2010 is fixed, and the position and orientation thereof in the world coordinate system are input as a known value in advance and are stored in a memory (not shown). A method for inputting the position and orientation of the camera 2010 is not limited to the above-described one. For example, a 6-DOF position and orientation sensor may be attached to the camera 2010 and the position and orientation of the camera 2010 may be input by obtaining a measurement value of the sensor.

As in FIG. 3A of the first embodiment, a plurality of indices $P^k$ whose placement information on the object coordinate system is known are placed on the object 2000. As in the first embodiment, each index $P^k$ may be in any form as long as screen coordinates of a projected image thereof in a captured image can be detected and as long as the index and points constituting the index can be identified.

The camera 2010 captures an image of the indices placed on the object. The captured image is input to the index detector 2020 through the image input unit 2015.

The index detector 2020 receives the image from the image input unit 2015 and detects image coordinates of the respective points constituting each index $P^k$ included in the input image, as the index detector 1020 according to the first embodiment. Then, the index detector 2020 outputs the image coordinates $u^{P^{kni}}$ of the respective points $P^{kni}$ constituting each detected index $P^{kn}$ and identifiers $k_n$ thereof to the position and orientation calculator 2070.

The position and orientation calculator 2070 receives the image coordinates and identifiers of the detected indices from the index detector 2020. Then, the position and orientation calculator 2070 calculates the position and orientation of the camera 2010 in the object coordinate system (hereinafter represented by $M_{OC}$) on the basis of placement information (known value) of the respective indices in the object coordinate system. A method for calculating the position and orientation of the camera on the basis of the image coordinates of a plurality of indices whose three-dimensional positions are known is a known technique, and thus the detailed description thereof is omitted. The calculated position and orientation of the camera 2010 are output to the data manager 2040.

The measurement value input unit 2030 receives the position and orientation of the 6-DOF position and orientation sensor A2 in the world coordinate system (hereinafter represented by $M_{WA2}$ as in the first embodiment) obtained from a measurement value of the 6-DOF position and orientation sensor A2 and outputs $M_{WA2}$ to the data manager 2040.

Upon receiving a data obtaining command from an operator (not shown), the instruction unit 2050 transmits instructions to "obtain data" to the data manager 2040. Upon receiving a calibration information calculating command, the instruction unit 2050 transmits instructions to "calculate calibration information" to the calibration information calculator 2060.

Upon receiving the instructions to "obtain data" from the instruction unit 2050, the data manager 2040 receives the position and orientation $M_{WA2}$ of the 6-DOF position and orientation sensor A2 in the world coordinate system from the measurement value input unit 2030, receives the position and orientation $M_{OC}$ of the camera 2010 in the object coordinate system from the position and orientation calculator 2070, and receives the position and orientation $M_{WC}$ of the camera 2010 in the world coordinate system from the memory (not shown). Then, the data manager 2040 adds a set of <the position and orientation $M_{WA2}$ of the 6-DOF position and orientation sensor A2 in the world coordinate system at a given time; the position and orientation $M_{OC}$ of the camera 2010 in the object coordinate system at the given time; and the position and orientation $M_{WC}$ of the camera 2010 in the world coordinate system at the given time> to a data list and holds the data list. Also, the data manager 2040 outputs the generated data list to the calibration information calculator 2060 in response to a request from the calibration information calculator 2060.

Upon receiving the instructions to "calculate calibration information" from the instruction unit 2050, the calibration information calculator 2060 receives the data list from the data manager 2040 and performs calibration on the basis of the data list. Then, the calibration information calculator 2060 outputs calibration information obtained through the calibration process, that is, the position and orientation of the 6-DOF position and orientation sensor A2 in the object coordinate system (hereinafter represented by $M_{OA2}$ as in the first embodiment).

Figure 5:
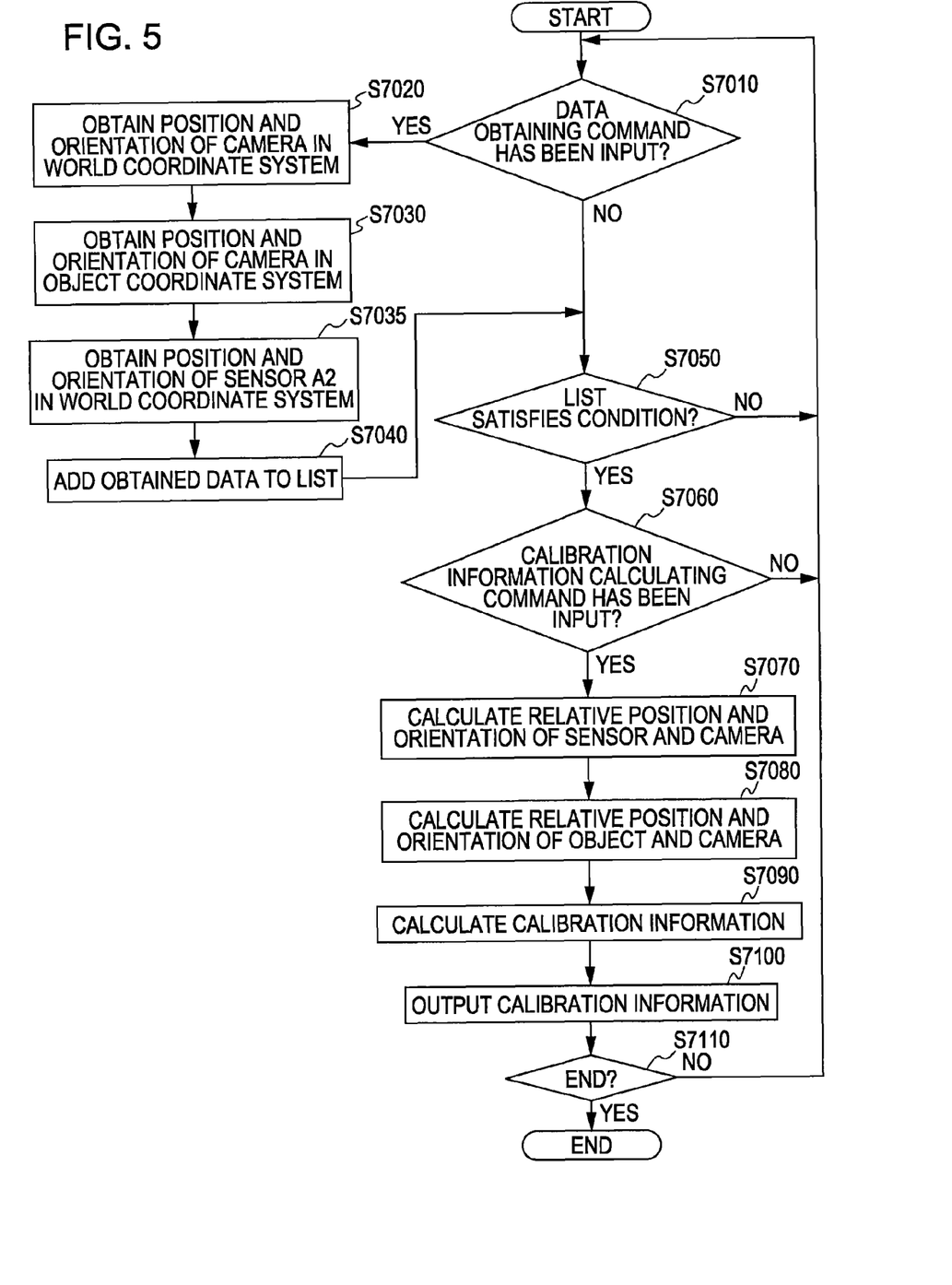
FIG. 5 is a flowchart showing a process of a sensor calibration method according to the second embodiment.

FIG. 5 is a flowchart showing a process of obtaining calibration information performed by the calibration apparatus according to the second embodiment. The program code of this flowchart is stored in a memory (not shown), such as a RAM or a ROM, and is read and executed by a CPU (not shown).

In step S7010, the instruction unit 2050 determines whether a data obtaining command has been input by an operator. The operator inputs the data obtaining command when the object 2000 or the camera 2010 is placed at a position of obtaining data for sensor calibration. If the instruction unit 2050 determines that the data obtaining command has been input, the process proceeds to step S7020.

In step S7020, the data manager 2040 receives information about the position and orientation of the camera 2010 in the world coordinate system from the memory (not shown).

In step S7030, the data manager 2040 receives the position and orientation of the camera 2010 in the object coordinate system from the position and orientation calculator 2070.

In step S7035, the data manger 2040 receives the position and orientation of the 6-DOF position and orientation sensor A2 attached to the object in the world coordinate system from the measurement value input unit 2030.

In step S7040, the data manager 2040 adds a set of input data as data $D_L$ to the data list DL.

With the above-described steps, the data is obtained.

In step S7050, the data manager 2040 determines whether the obtained data list has enough information to calculate calibration information. If the data list does not have enough information, the process returns to step S7010, where input of a data obtaining command is waited for. On the other hand, if the data list has enough information to calculate calibration information, the process proceeds to step S7060. The data list is determined to have enough information for calculating calibration information if at least two sets of data are included in the data list DL, for example. However, a solution can be obtained by using one set of data in the second embodiment, so that such a determining step need not always be done. Alternatively, a condition may be set so that more data is required.

Then, in step S7060, it is determined whether a calibration information calculating command has been input by the operator. If the calibration information calculating command has been input, the process proceeds to step S7070. On the other hand, if the calibration information calculating command has not been input, the process returns to step S7010, where input of a data obtaining command is waited for.

In step S7070, the position and orientation $M_{OA2}$ of the 6-DOF position and orientation sensor A2 in the object coordinate system to be calibrated is calculated for each set of data included in the data list DL by using expression (17), on the basis of the position and orientation $M_{WC}$ of the camera 2010 in the world coordinate system, the position and orientation $M_{WA2}$ of the 6-DOF position and orientation sensor A2 in the world coordinate system, and the position and orientation $M_{OC}$ of the camera 2010 in the object coordinate system.

$$M_{OA2} = M_{OC} \cdot M_{WC}^{-1} \cdot M_{WA2} \qquad \text{expression (17)}$$

If the data list DL includes a plurality of sets of data, an average of $M_{OA2i}$ (i=1, ..., N; N is the number of sets of data included in the data list DL) estimated for the respective sets of data by expression (17) is calculated, and the average is regarded as a final $M_{OA2}$. An average of a plurality of positions and orientations $M_i$ is calculated in the following way, for example. For a position component, an average t of three-dimensional vectors $t_i$ indicating the positions of respective $M_i$ is calculated. For an orientation component, rotation matrices $R_i$ representing the orientations of respective $M_i$ are transformed into four-dimensional vectors $\omega_i$, which are quaternion expression of orientations, and then an average $\omega$ of $\omega_i$ is calculated. Then, the obtained $\omega$ is transformed into a rotation matrix expression R of orientation, and the average is calculated on the basis of expression (1) by using the obtained position t and the orientation R. A mutual transformation between a rotation matrix expression and a quaternion expression of orientation is basic of three-dimensional geometry, and thus the details thereof are not described here.

When $N_j$ images are captured, expression (18) can be written by using $M_{OCi}$ and $M_{A2Ci}$ existing in each captured image.

$$\begin{bmatrix} M_{OC_1} \\ \vdots \\ M_{OC_i} \\ \vdots \\ M_{OC_{N_J}} \end{bmatrix} = \begin{bmatrix} M_{A2C_1} \\ \vdots \\ M_{A2C_i} \\ \vdots \\ M_{A2C_{N_J}} \end{bmatrix} \cdot M_{OA2} \qquad \text{expression (18)}$$

Herein, if $$A = \begin{bmatrix} M_{OC_1} \\ \vdots \\ M_{OC_i} \\ \vdots \\ M_{OC_{N_J}} \end{bmatrix} \qquad \text{expression (19)}$$

and $$B = \begin{bmatrix} M_{A2C_1} \\ \vdots \\ M_{A2C_i} \\ \vdots \\ M_{A2C_{N_J}} \end{bmatrix} \qquad \text{expression (20)}$$

are satisfied, expression (18) can be expressed by expression (21).

$$A = B \cdot M_{OA2} \qquad \text{expression (21)}$$

When a plurality of images are captured, $M_{OA2}$ may be calculated on the basis of expression (22) by using a generalized inverse matrix of B.

$$M_{OA2} = (B^t \cdot B)^{-1} \cdot B^t \cdot A \qquad \text{expression (22)}$$

But it may be calculated by another method. For example, expression (22) is synonymous with the solution of the simultaneous equations. The simultaneous equations may be −36 calculated by ICCG method, sweeping-out method, or another method.

In step S7080, the relative position and orientation between the object and the image capturing device is calculated. In step S7090, calibration information $M_{OA2}$ is calculated through the above described process. In step S7100, $M_{OA2}$ is output as calibration information, that is, as the position and orientation of the 6-DOF position and orientation sensor A2 in the object coordinate system. At this time, $M_{OA2}$ itself may be output. Alternatively, a position component of $M_{OA2}$ may be represented by a ternary vector t and an orientation component thereof may be represented by Euler angles or a 3×3 rotation matrix R. Another representing method may also be used.

Finally, in step S7110, it is determined whether the calibration process should be ended. If the operator provides instructions to end the calibration process to the sensor calibration apparatus 2100, the process ends. If the operator provides instructions to continue the calibration process (recalibration), the process returns to step S7010, where input of a data obtaining command is waited for.

With the above-described process, the position and orientation of the 6-DOF position and orientation sensor attached to an object with respect to the object (in the object coordinate system) can be obtained easily and accurately.

Other Embodiments

The present invention can be carried out by providing a storage medium (or a recording medium) storing program code of software to realize the functions of the above-described embodiments to a system or an apparatus and allowing a computer (CPU or MPU) of the system or the apparatus to read and execute the program code stored in the storage medium. In that case, the program code read from the storage medium realizes the functions of the above-described embodiments, and thus the storage medium storing the program code is included in the present invention. The functions of the above-described embodiments may be realized when the computer executes the read program code. Alternatively, the functions of the above-described embodiments may be realized when an operating system (OS) or the like operating on the computer executes part or all of actual processing on the basis of instructions of the program code.

Alternatively, after the program code read from the storage medium has been written in a memory provided in a function expanding card inserted into the computer or a function expanding unit connected to the computer, a CPU or the like provided in the function expanding card or the function expanding unit may execute part or all of actual processing on the basis of the instructions of the program code, so that the functions of the above-described embodiments may be realized.

When the present invention is applied to the above-described storage medium, the program code corresponding to the flowchart shown in FIG. 2 is stored in the storage medium.

As many apparently widely different embodiments of the present invention can be made without departing from the sprit and scope thereof, it is to be understood that the invention is not limited to the specific embodiments thereof except as defined in the appended claims.

This application claims the benefit of Japanese Application No. 2005-217555 filed Jul. 27, 2005, which is hereby incorporated by reference herein in its entirety.

What is claimed is:

1. An information processing method for calibrating a position and orientation of a sensor in an object coordinate system based on an object, the sensor being attached to the object used to measure a position and orientation of the sensor in a world coordinate system, and a position and orientation of the sensor in the object coordinate system is stored in a storage unit, the information processing method comprising:

an image input step of inputting an image of the object captured by an image capturing device;

a sensor measurement value input step of inputting a measurement value of the position and orientation of the sensor in the world coordinate system;

an index detecting step of detecting information about image coordinates of an index attached to the object from the image, wherein a position of the index in the object coordinate system is known;

a position and orientation input step of inputting a position and orientation of the image capturing device in the world coordinate system;

a relative position and orientation calculation step of calculating a relative position and orientation between the index attached to the object and the image capturing device on the basis of the measurement value of the position and orientation of the sensor in the world coordinate system input in the sensor measurement value input step and the position of the index in the object coordinate system;

an image coordinates calculation step of calculating image coordinates of the index in the image on the basis of the position of the index in the object coordination system, the relative position and orientation calculated in the relative position and orientation calculation step, and the position and orientation of the image capturing device input in the world coordinate system in the position and orientation input step;

a difference calculation step of calculating a difference value with the image coordinates detected in the index detecting step and the image coordinates calculated in the image coordinates calculation step;

a correction value calculation step of calculating a correction value of a position and orientation of the sensor in the object coordinate system on the basis of the difference value calculated in the difference calculation step and the relative position and orientation calculated in the relative position and orientation calculation step; and a calibration step of calibrating the stored position and orientation of the sensor in the object coordinate system on the basis of the correction value.

2. The information processing method according to claim 1, further comprising:

a determination step of determining whether a correction value is more than a threshold value stored in advance; and re-executing the image input step, the sensor measurement value input step, the position and orientation input step, the relative position and orientation calculation step, the image coordinates calculation step, the difference calculation step, the correction value calculation step, and the calibration step, when the correction value is determined to be more than the threshold value in the determination step.

3. An information processing apparatus to calibrate a position and orientation of a sensor in an object coordinate system based on an object, the sensor being attached to the object used to measure a position and orientation of the sensor in a world coordinate system, the information processing apparatus comprising:

a storage unit adapted to store a position and orientation of the sensor in the object coordinate system;

an image input unit adapted to input an image of the object captured by an image capturing device;

a measurement value input unit adapted to input a measurement value of the position and orientation of the sensor in the world coordinate system;

a detecting unit adapted to detect information about image coordinates of an index attached to the object from the image, wherein a position of the index in the object coordinate system is known;

a position and orientation input unit adapted to input a position and orientation of the image capturing device in the world coordinate system;

a relative position and orientation calculation unit adapted to calculate a relative position and orientation between the index attached to the object and the image capturing device on the basis of the measurement value of the position and orientation of the sensor in the world coordinate system input in the sensor measurement value input unit and the position of the index in the object coordinate system;

an image coordinates calculation unit adapted to calculate image coordinates of the index in the image on the basis of the position of the index in the object coordination system, the relative position and orientation calculated in the relative position and orientation calculation unit, and the position and orientation of the image capturing device in the world coordinate system input by the position and orientation input unit;

a difference calculation unit adapted to calculate a difference value with the image coordinates detected in the detecting unit and the image coordinates calculated in the image coordinates calculation unit;

a correction value calculation unit adapted to calculate a correction value of the position and orientation of the sensor in the object coordinate system on the basis of the difference value calculated in the difference calculation unit and the relative position and orientation calculated in the relative position and orientation calculation unit; and a calibration unit adapted to calibrate the stored position and orientation of the sensor in the object coordinate system on the basis of the correction value.

4. A non-transitory computer-readable medium encoded with a computer program for performing an information processing method for calibrating a position and orientation of a sensor in an object coordinate system based on an object, the sensor being attached to the object used to measure the position and orientation of the sensor in a world coordinate system and the object coordinate system based on the object, the computer including a storage unit that stores a position and orientation of the sensor in the object coordinate system, the information processing method comprising:

an image input step of inputting an image of the object captured by an image capturing device;

a sensor measurement value input step of inputting a measurement value of the position and orientation of the sensor in the world coordinate system;

an index detecting step of detecting information about image coordinates of an index attached to the object from the image, wherein a position of the index in the object coordinate system is known;

a position and orientation input step of inputting a position and orientation of the image capturing device in the world coordinate system;

a relative position and orientation calculation step of calculating a relative position and orientation between the index attached to the object and the image capturing device on the basis of the measurement value of the position and orientation of the sensor in the world coordinate system input in the sensor measurement value input step and the position of the index in the object coordinate system;

an image coordinates calculation step of calculating image coordinates of the index in the image on the basis of the position of the index in the object coordinate system, the relative position and orientation calculated in the relative position and orientation calculation step, and the position and orientation of the image capturing device input in the world coordinate system in the position and orientation input step;

a difference calculation step of calculating a difference value with the image coordinates detected in the index detecting step and the image coordinates calculated in the image coordinates calculation step;

a correction value calculation step of calculating a correction value of the position and orientation of the sensor in the object coordinate system on the basis of the difference value calculated in the difference calculation step and the relative position and orientation calculated in the relative position and orientation calculation step; and a calibration step of calibrating the stored position and orientation of the sensor in the object coordinate system on the basis of the correction value.

* * * * *